W. J. CLARK.
TOOTH PASTE CONTAINER.
APPLICATION FILED NOV. 19, 1912.
1,084,537.
Patented Jan. 13, 1914.
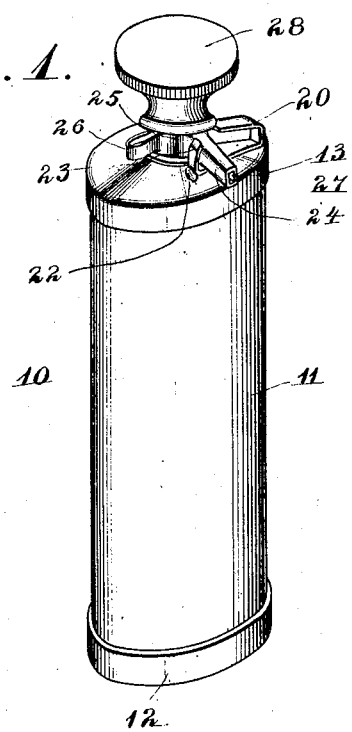
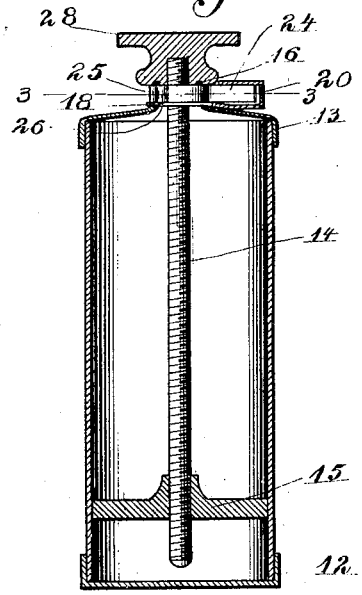
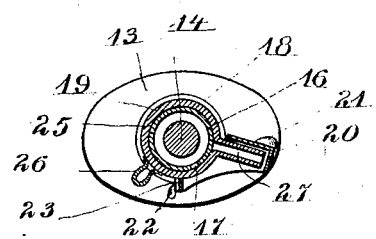
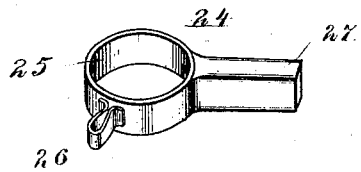
Witnesses
R. F. Maryman
A. H. Hoster
Inventor
W. J. Clark.
By Victor J. Evans.
Attorney

UNITED STATES PATENT OFFICE.

WALTER J. CLARK, OF FORT SCOTT, KANSAS.

TOOTH-PASTE CONTAINER.

1,084,537.
Specification of Letters Patent.
Patented Jan. 13, 1914.

Application filed November 19, 1912. Serial No. 732,300.

*To all whom it may concern:*

Be it known that I, WALTER J. CLARK, a citizen of the United States, residing at Fort Scott, in the county of Bourbon and State of Kansas, have invented new and useful Improvements in Tooth-Paste Containers, of which the following is a specification.

The invention relates to receptacles and has for an object to provide a device for receiving and discharging semi-solid and pasty substances.

The invention is particularly adaptable for use as a container for tooth paste, glues or other semi-solid substances in which it is desired to retain the receptacle in sealed condition when same is not in use, the semi-solid substances being removed from the receptacle only in small quantities at certain intervals of time.

The invention embodies a receptacle which is non-collapsible thus doing away with a large number of discrepancies occasioned in the use of receptacles of collapsible nature and which are generally employed to contain semi-solid substances, the substance being squeezed or forced out of collapsible receptacles by pressing the walls of same together. In receptacles of this type when the walls of the receptacle are pressed together, they ofttimes become punctured, thus causing the semi-solid substance to flow through the break in the walls. In the use of my device however the receptacle proper is non-collapsible and the semi-solid substance can be forced out of the receptacle in a more efficient and convenient manner than in the use of collapsible receptacles containing semi-solid substances.

In the further disclosure of the invention reference is to be had to the accompanying drawings constituting a part of this specification in which like reference characters denote corresponding parts in all of the views, and in which—

Figure 1 is a perspective view showing the spout of the receptacle in open and unsealed position. Fig. 2 is a vertical sectional view of the structure disclosed in Fig. 1, showing the spout in closed or sealed position. Fig. 3 is a horizontal sectional view taken on line 3—3 of Fig. 2. Fig. 4 is a perspective view of the spout.

Referring more particularly to the views I disclose a receptacle 10 including a tubular container 11 preferably made of metal and non-collapsible, the said container having a bottom 12 and cover 13 with a screw rod 14 depending within the container 11 and having threadedly mounted thereon a diaphragm 15 which when rotation is imparted to the screw rod 14 will be advanced in the container 11.

The cover 13 has an integral tubular collar 16 provided with an aperture 17 and the screw rod 14 projects upwardly through the collar 16 as shown. A sealing cap 18 is arranged in stationary position on the cover 13 and preferably consists of a single piece of material stamped to form a collar 19, encircling the collar 16, the said piece of material being then bent to form a closure 20 abutting against a bead 21 formed on the cover 13, a second bead 22 being formed on the cover and engaged by a stop member 23 formed integrally with the sealing cap 18 so that the sealing cap will lie between the beads 21 and 22 and engage the same in order to retain the sealing cap rigidly on the cover 13, the closure 20 however being at all times out of alinement with the aperture 17 as shown.

A spout member 24 is revolubly mounted on the collar 16 of the cover 13, the said spout member being preferably formed of a single piece of material bent to form a collar 25 encircling the collar 16, and then bent to form a handle 26 to the spout 27, it being readily seen that by grasping the handle 26, and imparting rotation to the spout member 24 the spout 27 can be moved into the closure 20 to seal the same or can be rotated on the collar 16 so that the aperture 17 in the collar will register with the spout 27, the stop member 23 being adapted to be engaged by the spout 27 when the same registers with the aperture 17 to limit the rotation of the spout member 24.

An operating knob 28 has threaded connection with the upper projecting end of the screw rod 14 and when the operating knob is rotated in one direction, the said knob will frictionally engage the spout member 24 thus turning same out of sealing position and into open position so that the spout 27 will register with the aperture 17 in the collar 16, it being further seen that the rotation of the operating knob in the manner mentioned will impart rotation to the screw rod 14 thus advancing the diaphragm 15 in the container 11 in forcing the semi-solid or pasty substance in the container upwardly and out of the aperture 17 and spout 27.

It should be particularly noted that it is only necessary to rotate the knob in one direction in order to produce the mentioned result, in view of the fact that, at the moment rotation is imparted to the knob, the diaphragm will be advanced to compress the contents of the container, thus creating a downward pull on the screw rod and which results in the knob being held in positive frictional engagement with the collar 25 of the spout member 24 so that the rotation of the knob will almost incidentally actuate the spout member to move the same from closed to open position.

When it is desired to return the spout member to sealed position, the handle 26 is pressed in the direction opposite to the rotation of the operating knob and moving the spout member into open position, thus returning the spout member to sealed position with the free end of the spout lying within the closure 20 thus sealing same.

From the foregoing description it will thus be seen that with a device of the character described it is only necessary to impart rotation to the knob 28 in one direction to unseal the spout 27 moving same into open position and the rotation of the said knob will furthermore advance the diaphragm 15 in the container 11 to force the semi-solid substance out through the spout so that the same can be conveniently applied to a brush or other article. It will be further noted that when the spout member 24 is moved from open to closed position there will be no operation of the knob 28 in view of the fact that the spout member is only moved into open position by frictional contacting of the operating knob therewith when the operating knob is screwed down by the screw rod 14, it being thus noted that a reverse movement of the spout member 24 will not interfere with the operating knob 28 and which will remain stationary during this portion of the operation.

Having thus described the invention, what is claimed as new is:

1. In a device of the character described, the combination with a non-collapsible tubular container, of a cover therefor, a collar formed with the said cover, a screw rod passing through said collar and depending in the said container, a diaphragm threadedly supported on the said screw rod and adapted to be advanced in the said container when said screw rod is actuated, a sealing cap supported on the said cover, a spout member revolubly supported on the said collar and normally closed by the said cap and a knob having connection with the said screw rod for operating the same to advance the said diaphragm in the said container and engage the said spout member to move the same out of engagement with the said cap and into registration with an opening in the collar.

2. In a device of the class described, the combination with a container, of a cover therefor, a sealing cap supported on the cover, a screw rod depending from the said container, a diaphragm carried by the screw rod and adapted to advance in the container when the screw rod is actuated, a spout member movable on said cover and normally closed by the said cap and an operating knob for simultaneously advancing the diaphragm in said container and moving said spout member out of engagement with said cap and into registration with an opening in the cover.

3. In a device of the class described, the combination with a container, of a cover therefor, a screw rod depending in the container, a diaphragm carried by the screw rod and adapted to be advanced in the container when the screw rod is actuated, a sealing cap supported on the cover, a spout member revolubly mounted on said cover and normally closed by the sealing cap, an operating knob having connection with the said screw rod for simultaneously advancing the diaphragm in the said container and moving the said spout member out of engagement with said sealing cap and into registration with the opening in the cover and a stop member for limiting the turning movement of the said spout member.

4. In a device of the class described, the combination with a container, of a cover therefor, a screw rod depending in the container, a diaphragm carried by the screw rod and adapted to be advanced in the container when the screw rod is actuated, a sealing cap supported on the cover, a spout member revolubly mounted on said cover and normally closed by the sealing cap, an operating knob having connection with the said screw rod for simultaneously advancing the diaphragm in the said container and moving the said spout member out of engagement with said sealing cap and into registration with the opening in the cover and a stop member for limiting the turning movement of the said spout member, and a handle on said spout member for returning spout member into engagement with said sealing cap to close the spout member.

5. In a device of the class described, the combination with a container, of a cover therefor, a collar integral with the cover and provided with an outlet, a sealing cap on the cover, a diaphragm movable in the container, a spout member revoluble on the collar of the cover and normally closed by the said sealing cap, an operating knob for moving the said spout member out of engagement with the sealing cap and into registration with the outlet in the collar when the knob is actuated, and means connecting the said knob with the said diaphragm for advancing the same in the container when the knob is actuated.

6. In a device of the class described, the combination with a container, of a cover therefor, a collar integral with the cover and provided with an outlet, a sealing cap on the cover, a diaphragm movable in the container, a spout member revoluble on the collar, an operating knob for moving the said spout member out of engagement with the sealing cap and into registration with the outlet in the collar when the knob is actuated, means connecting the said knob with the said diaphragm for advancing the same in the container when the knob is actuated, and a handle on the spout member for returning the spout member to sealed position within the said sealing cap.

7. In a device of the class described, the combination with a container, of a cover therefor, a collar integral with the cover and provided with an outlet, a sealing cap on the cover, a diaphragm movable in the container, a spout member revoluble on the collar, an operating knob for moving the said spout member out of engagement with the sealing cap and into registration with the outlet in the collar when the knob is actuated, a screw rod connecting the said knob with the said diaphragm for advancing the same in the container when the knob is actuated, and a handle on the spout member for returning the spout member to sealed position within the said sealing cap.

In testimony whereof I affix my signature in presence of two witnesses.

WALTER J. CLARK.

Witnesses:
HUBERT LARDNER,
KATIE HUNKER.